(12) United States Patent
Okawa

(10) Patent No.: US 11,712,855 B2
(45) Date of Patent: Aug. 1, 2023

(54) SHAPING SYSTEM, AND SHAPING APPARATUS

(71) Applicant: MIMAKI ENGINEERING CO., LTD., Nagano (JP)

(72) Inventor: Masakatsu Okawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 16 days.

(21) Appl. No.: 17/517,688

(22) Filed: Nov. 3, 2021

(65) Prior Publication Data

US 2022/0055310 A1 Feb. 24, 2022

Related U.S. Application Data

(62) Division of application No. 15/917,849, filed on Mar. 12, 2018, now Pat. No. 11,192,307.

(30) Foreign Application Priority Data

Mar. 15, 2017 (JP) ................................ 2017-049495

(51) Int. Cl.

| B29C 64/393 | (2017.01) |
|---|---|
| B33Y 10/00 | (2015.01) |
| B33Y 50/02 | (2015.01) |
| B29C 64/112 | (2017.01) |
| G05B 19/4099 | (2006.01) |
| B33Y 30/00 | (2015.01) |

(Continued)

(52) U.S. Cl.
CPC .......... *B29C 64/393* (2017.08); *B29C 64/112* (2017.08); *B33Y 10/00* (2014.12); *B33Y 50/02* (2014.12); *G05B 19/4099* (2013.01); *B29C 64/209* (2017.08); *B29K 2105/0032* (2013.01); *B33Y 30/00* (2014.12); *G05B 2219/35134* (2013.01); *G05B 2219/49007* (2013.01)

(58) Field of Classification Search
None
See application file for complete search history.

(56) References Cited

U.S. PATENT DOCUMENTS

2018/0117847 A1* 5/2018 Ohi ........................ H04N 1/46

FOREIGN PATENT DOCUMENTS

| JP | 2000-280354 A | * 10/2000 |
|---|---|---|
| JP | 2016-198990 A | * 12/2016 |

* cited by examiner

*Primary Examiner* — Mohammad M Ameen
(74) *Attorney, Agent, or Firm* — JCIPRNET

(57) ABSTRACT

Disclosed is a shaping system for shaping a three-dimensional object, which includes a slice data generation step that generates slice data and a shaping execution step that shapes the three-dimensional object by a shaping apparatus based on the slice data. The shaping apparatus shapes the three-dimensional object using inkjet heads. The slice data generation step has a color cross-section data generation step that generates color cross-section data showing at least a cross-sectional shape of the three-dimensional object and a color at each position, a plate division data generation step that generates plate division cross-section data in which the color cross-section data is color-separated for each color of the material, and a plate division cross-section data change step that changes at least some plate division cross-section data. The slice data is generated based on the plate division cross-section data changed in the plate division cross-section data change step.

2 Claims, 6 Drawing Sheets

(51) Int. Cl.
*B29C 64/209* (2017.01)
*B29K 105/00* (2006.01)

SHAPING SYSTEM, AND SHAPING APPARATUS

CROSS REFERENCE TO RELATED APPLICATIONS

This application is a divisional of patent application Ser. No. 15/917,849, filed on Mar. 12, 2018, wherein the patent application Ser. No. 15/917,849 claims the priority benefit of Japanese Patent Application No. 2017-049495, filed on Mar. 15, 2017. The entirety of each of the above-mentioned patent applications is hereby incorporated by reference herein and made a part of this specification.

TECHNICAL FIELD

The present disclosure relates to a shaping method, a shaping system, and a shaping apparatus.

DESCRIPTION OF THE BACKGROUND ART

Conventionally, there has been known a shaping apparatus (3D printer) for shaping a three-dimensional object using an inkjet head (for example, Japanese Laid-Open Patent Publication No. 2015-71282). In such a shaping apparatus, for example, ink layers formed by an inkjet head are stacked to shape a three-dimensional object by a layered shaping method.

Patent Literature: Japanese Patent Application Laid-open No. 2015-71282

SUMMARY

In the case of shaping a three-dimensional object by the layered shaping method, each layer to be stacked is formed by discharging a material for shaping to an ejection position determined according to the resolution of shaping. However, in this case, a deviation may occur between a position (landing position) at which the shaping material is actually ejected and the ejection position on design. In addition, as a result, the quality of the three-dimensional object may be deteriorated.

More specifically, for example, in the case of shaping a three-dimensional object whose surface is colored, if a landing position of a coloring material deviates, a difference may occur in tint depending on the position of the three-dimensional object. In addition, as a result, the quality of the three-dimensional object may be deteriorated. Thus, conventionally, for example, in the case of shaping a three-dimensional object whose surface is colored, it has been desired to carry out shaping by a more appropriate method. Thus, the present disclosure aims to provide a shaping method, a shaping system, and a shaping apparatus capable of solving the above-mentioned problems.

When it is intended to suppress the problem caused by the deviation of the landing position of the coloring material, ideally, it is desirable to prevent occurrence of such a landing position deviation itself. However, depending on a configuration of a shaping apparatus, it may be difficult to completely prevent the landing position deviation. More specifically, for example, in the case of discharging a material for shaping by an inkjet method using an inkjet head, it is difficult to completely eliminate a deviation of a landing position of the ink used as the shaping material.

Thus, the inventor of the present application further studied a method of making inconspicuous the influence even when a landing position of a material for coloring deviates. With respect to slice data used for controlling a shaping apparatus at the time of shaping, attention is focused on plate division data (plate division cross-section data) in which color data showing a cross section of a three-dimensional object is color-separated, and the inventor has found that the influence of the landing position deviation as described above can be suppressed by performing a predetermined change in at least some plate division data. More specifically, as a change in the plate division data, it is considered to change at least a portion of a position where the shaping material is ejected according to the plate division cross-section data.

Also, by more earnest researches, the inventor found the necessary characteristics to obtain such effects, and has reached the present disclosure. In order to solve the above-mentioned problems, the present disclosure provides a shaping method for shaping a three-dimensional object, at least the surface of which is colored. The shaping method comprises a slice data generation step of generating a plurality of slice data, showing a configuration of a cross section of the three-dimensional object at different positions in a preset stacking direction, based on shaping data which is data showing the three-dimensional object to be shaped by a shaping apparatus and a shaping execution step of shaping the three-dimensional object by the shaping apparatus based on the plurality of slice data. In the shaping method, the shaping apparatus shapes the three-dimensional object using a plurality of ejection heads for discharging materials of plural colors different from one another. The slice data generation step comprises a color cross-section data generation step of generating color cross-section data which is data showing the configuration of the cross section of the three-dimensional object at a preset cross-sectional position in the stacking direction and shows at least a shape of the cross section and a color of the three-dimensional object at each position of the cross section, a plate division data generation step of generating plate division cross-section data which is data in which the color cross-section data is color-separated for each color of the material used for shaping the three-dimensional object, and a plate division cross-section data change step of changing the plate division cross-section data such that at least a portion of a position where the material is ejected according to the plate division cross-section data is changed with respect to at least some of the plate division cross-section data. The shaping apparatus generates the slice data based on the plate division cross-section data changed in the plate division cross-section data change step.

With such a configuration, for example, even when a landing position of a coloring material deviates, it is possible to adjust such that the influence on the appearance of the color of the three-dimensional object or the like can be reduced. This also makes it possible, for example, to suitably suppress deterioration of the quality of the three-dimensional object and to suitably shape a high-quality three-dimensional object in the case of shaping a three-dimensional object whose surface is colored.

In this case, it is conceivable to change the plate division cross-section data so as to change the range (the range of the plate division cross-section data) in which a material for shaping is ejected according to the plate division cross-section data. The range in which the shaping material is ejected according to the plate division cross-section data is, for example, a range in a plane orthogonal to the stacking direction. More specifically, it is conceivable to increase the range in which the shaping material is ejected according to the plate division cross-section data corresponding to any color is made larger than a range corresponding to other colors and thereby form an outermost side (outermost portion) of a three-dimensional object with a certain color. With such a configuration, for example, even when a landing position of a coloring material deviates, it is possible to suitably suppress a change in the appearance of color.

In this case, for example, it is conceivable to make a range of the plate division cross-section data, corresponding to bright color with little light absorption, larger than a range of another color and thereby set a range of the plate division cross-section data of each color so as to prevent the range of the plate division cross-section data of another color from exceeding the range of the bright color. For example, when a three-dimensional object is colored using materials of yellow, magenta, cyan, and black, it is preferable to set the range of the plate division cross-section data of each color so as to prevent the range of the plate division cross-section data of another color from exceeding the range of the plate division cross-section data corresponding to yellow. With such a configuration, for example, even when a landing position of a coloring material deviates, it is possible to suitably prevent a dark-colored material from deviating outside the three-dimensional object. This also makes it possible, for example, to more suitably suppress the change in the appearance of color.

When the plate division cross-section data is changed, for example, it is conceivable to shift a position in the plane orthogonal to the stacking direction on coordinates that manage a position of the plate division cross-section data. In this case, for example, even when the landing position of the coloring material is deviated by changing the way of shifting the position of the plate division cross-section data for each layer to be stacked, the influence of the deviation can be dispersed and averaged. This also makes it possible, for example, to suppress the influence of the appearance of color in individual layers on the side surface of the three-dimensional object or the like, and to suitably express a desired color (tint) as the color of the surface.

Here, when the deviation amount of the landing position of the coloring material is particularly large, it is preferable not to change the plate division cross-section data but to reduce the deviation by, for example, adjusting an ejection timing of the material. For this reason, when the plate division cross-section data is changed, for example, it is preferable to change the range and position by a minimum interval (minimum inter-dot pitch) of the ejection position according to the resolution of shaping. With such a configuration, for example, it is possible to suitably suppress the influence of the deviation of the landing position of the coloring material without excessively changing the plate division cross-section data.

Further, when the plate division cross-section data is changed, for example, it is conceivable to change a density at the position where the shaping material is ejected. In this case, for example, it is conceivable to change the plate division cross-section data so as to reduce a density in a region outside the three-dimensional object. With such a configuration, for example, even when the landing position of the coloring material deviates, it is possible to suitably suppress the influence on an outermost surface of the three-dimensional object. This also makes it possible, for example, to suitably suppress the change in the appearance of color and the like.

As a configuration of the present disclosure, it is also conceivable to use a shaping system, a shaping apparatus or the like having the same characteristics as those described above. Even in these cases, for example, the same effect as described above can be obtained. The shaping method described above may be considered as a manufacturing method for a three-dimensional object.

According to the present disclosure, for example, when a three-dimensional object whose surface is colored is shaped, a high-quality three-dimensional object can be suitably shaped.

BRIEF DESCRIPTION OF THE DRAWINGS

FIGS. 1(a) to 1(c) are diagrams showing an example of a shaping system 10 for executing a shaping method for a three-dimensional object according to an embodiment of the present disclosure, wherein FIG. 1(a) shows an example of a configuration of the shaping system 10, FIG. 1(b) shows an example of a configuration of a relevant portion of a shaping apparatus 12, and FIG. 1(c) shows an example of a more detailed configuration of a head part 102;

FIGS. 2(a) and 2(b) are diagrams showing an example of an operation that generates slice data, wherein FIG. 2(a) is a cross-sectional view showing an example of a configuration of a three-dimensional object 50 to be shaped by the shaping apparatus 12, and FIG. 2(b) is a diagram schematically showing a portion of the operation that generates the slice data in a control PC 14;

FIGS. 3(a) to 3(c) are diagrams for explaining the influence of deviation of a landing position of ink and the like, wherein FIG. 3(a) is a diagram showing an example of a state in which a landing position deviation (Y deviation) occurs in a main scanning direction (Y direction), FIG. 3(b) is a diagram for explaining a change in tint on a side surface of the three-dimensional object 50, and FIG. 3(c) is a diagram showing an example of a state in which a landing position deviation (X deviation) occurs in a sub scanning direction (X direction);

FIGS. 4(a) and 4(b) are diagrams schematically showing an example of how to change plate division cross-section data, wherein FIG. 4(a) is a diagram showing an example of how to change a range in which ink is ejected according to the plate division cross-section data, and FIG. 4(b) shows an example of a state in which plate division cross-section data 304y and color cross-section data 302c are superposed;

FIGS. 5(a) and 5(b) are diagram schematically showing another example of how to change the plate division cross-section data, wherein FIG. 5(a) is a diagram showing an example of how to shift a position of the plate division cross-section data, and FIG. 5(b) schematically shows a state in which ink layers are formed while shifting positions of some plate division cross-section data.

DETAILED DESCRIPTION OF EMBODIMENTS

Figure 1A:
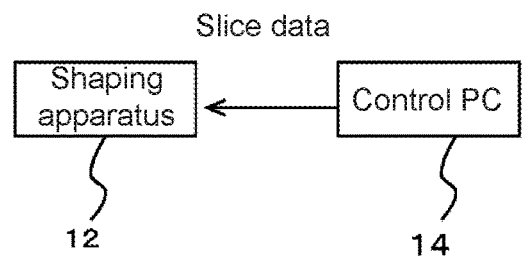
Figure 1B:
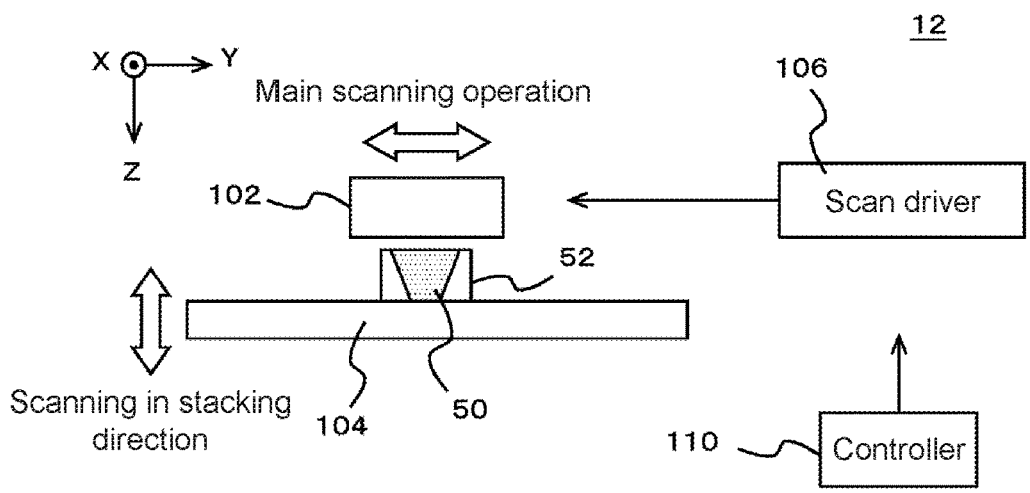
Figure 1C:
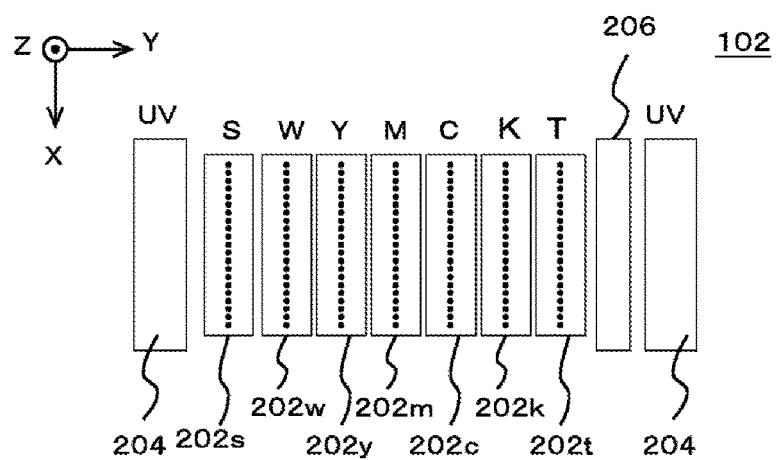

Hereinafter, embodiments of the present disclosure will be described with reference to the drawings. FIGS. 1(a) to 1(c) show an example of a shaping system 10 for executing a shaping method for a three-dimensional object (manufacturing method for a three-dimensional object) according to an embodiment of the present disclosure. FIG. 1(a) shows an example of a configuration of the shaping system 10. In this example, the shaping system 10 includes a shaping apparatus 12 and a control PC 14.

The shaping apparatus 12 is an apparatus for executing shaping of a three-dimensional object and shapes a three-dimensional object under the control of the control PC 14. In this example, shaping operation performed in the shaping apparatus 12 is an example of operation of a shaping execution stage. More specifically, the shaping apparatus 12 is, for example, a shaping apparatus for shaping a three-dimensional object, at least the surface of which is colored, receives slice data, which is data showing a cross-sectional configuration of a three-dimensional object to be shaped, from the control PC 14, and shapes the three-dimensional object based on the slice data. In this case, the shaping apparatus 12 receives from the control PC 14 a plurality of slice data respectively showing cross sections at different positions in the three-dimensional object to be shaped.

The control PC 14 is a shaping controller (host PC) that controls the operation of the shaping apparatus 12. In this example, the control PC 14 externally receives shaping data showing the three-dimensional object to be shaped by the shaping apparatus 12 in a predetermined format, and generates slice data, corresponding to the cross section at each position of the three-dimensional object 50, based on this shaping data. Further, the control PC 14 supplies the generated plural slice data to the shaping apparatus 12 and thereby controls the shaping operation by the shaping apparatus 12.

As the shaping data, for example, general-purpose 3D data or the like independent of the model of the shaping apparatus 12 and the like can be suitably used. Furthermore, the control PC 14 may generate the shaping data in the control PC 14 according to, for example, user's operation, instead of externally obtaining the shaping data. As described above, in this example, the shaping system 10 is constituted by a plurality of apparatuses (the shaping apparatus 12 and the control PC 14). However, in a variation of the shaping system 10, the shaping system 10 may be constituted by a single device. In this case, for example, it is conceivable to constitute the shaping system 10 only by the shaping apparatus 12 including the function of the control PC 14.

Next, a specific configuration of the shaping apparatus 12 will be described. FIG. 1(b) shows an example of a configuration of a relevant portion of a shaping apparatus 12, and in this example, the shaping apparatus 12 has a head part 102, a shaping table 104, a scan driver 106, and a controller 110.

Except for the points to be described below, the shaping apparatus 12 may have the same or similar features as known shaping apparatuses. More specifically, except for the points to be described below, the shaping apparatus 12 may have the same or similar features as the known shaping apparatus that performs shaping by ejecting droplets, which are materials of the three-dimensional object 50, using an inkjet head, for example. Moreover, in addition to the configuration illustrated, the shaping apparatus 12 may further be provided with any other configuration required for shaping and coloring the three-dimensional object 50, for example. In this example, the shaping apparatus 12 is a shaping apparatus (3D printer) for shaping the three-dimensional object 50 by a layered shaping method. In this case, the layered shaping method is, for example, a method of stacking a plurality of layers to shape the three-dimensional object 50. The three-dimensional object 50 is, for example, a stereoscopic three-dimensional structure.

The head part 102 is a unit that ejects the material of the three-dimensional object 50. In this example, ink is used as the material of the three-dimensional object 50. In this case, the ink means, for example, a liquid ejected from the inkjet head. More specifically, the head part 102 ejects, as the material of the three-dimensional object 50, ink to be cured according to predetermined conditions from a plurality of inkjet heads, which are examples of the plurality of ejection heads. Then, the ink after landing is cured, whereby the layers constituting the three-dimensional object 50 are formed in an overlapped manner, and a three-dimensional object is shaped by the layered shaping method. In this example, an ultraviolet curable ink (UV ink) cured from a liquid state by irradiation with ultraviolet light is used as the ink.

The head part 102 further ejects a material of a support layer 52 in addition to the material of the three-dimensional object 50. In this way, the shaping apparatus 12 forms the support layer 52 around the three-dimensional object 50 as needed. The support layer 52 is, for example, a laminated structure that supports the three-dimensional object 50 by surrounding an outer periphery of the three-dimensional object 50 being shaped. The support layer 52 is formed as needed at the time of shaping of the three-dimensional object 50, and is removed after completion of shaping. A more specific configuration of the head part 102 will be described in more detail later with reference to FIG. 1(c).

The shaping table 104 is a trapezoidal member supporting the three-dimensional object 50 being shaped, is disposed at a position facing the inkjet head in the head part 102, and places the three-dimensional object 50 being shaped on the upper surface. In this example, at least the upper surface of the shaping table 104 can move in the stacking direction (Z direction in the drawing), and when driven by the scan driver 106, the shaping table 104 moves at least its upper surface in accordance with progression of shaping of the three-dimensional object 50. In this case, the stacking direction is, for example, a direction in which materials for shaping are stacked in the layered shaping method. More specifically, in this example, the stacking direction is a direction orthogonal to a main scanning direction (Y direction in the drawing) and a sub scanning direction (X direction in the drawing).

The scan driver 106 is a driving section that allows the head part 102 to perform a scanning operation that relatively moves the head part 102 to the three-dimensional object 50 being shaped. In this case, the relative movement with respect to the three-dimensional object 50 being shaped is, for example, relative movement with respect to the shaping table 104. To allow the head part 102 to perform the scanning operation is, for example, to allow the inkjet head of the head part 102 to perform the scanning operation. In this example, the scan driver 106 allows the head part 102 to perform a main scanning operation (Y scanning), a sub scanning operation (X scanning), and scanning in the stacking direction (Z scanning).

The main scanning operation is, for example, an operation that ejects ink while moving in the main scanning direction. In this example, the scan driver 106 fixes the position of the shaping table 104 in the main scanning direction, allows the shaping table 104 to move by the head part 102, and thereby allows the head part 102 to perform the main scanning operation. On the other hand, for example, the scan driver 106 may fix the position of the head part 102 in the main scanning direction, allows the shaping table 104 to move, for example, and thereby allows the head part 102 to move by the three-dimensional object 50.

The sub scanning operation is, for example, an operation that relatively moves with respect to the shaping table 104 in the sub scanning direction orthogonal to the main scanning direction. More specifically, the sub scanning operation is, for example, an operation that relatively moves with respect to the shaping table 104 in the sub scanning direction by a preset feed amount. In this example, the scan driver 106 fixes the position of the head part 102 in the sub scanning direction between the main scanning operations, allows the shaping table 104 to move, and thereby allows the head part 102 to perform the sub scanning operation. On the other hand, the scan driver 106 fixes the position of the shaping table 104 in the sub scanning direction, allows the head part 102 to move, and thereby allows the head part 102 to perform the sub scanning operation.

The scanning in the stacking direction scanning is, for example, an operation that moves at least one of the head part 102 and the shaping table 104 in the stacking direction to move the head part 102 in the stacking direction relatively with respect to the three-dimensional object 50. In addition, the scan driver 106 allows the head part 102 to perform the scanning in the stacking direction in accordance with progression of the shaping operation to adjust a relative position of the inkjet head with respect to the three-dimensional object 50 being shaped in the stacking direction. More specifically, in this example, the scan driver 106 fixes the position of the head part 102 in the stacking direction and moves the shaping table 104. The scan driver 106 may move the head part 102 while fixing the position of the shaping table 104 in the stacking direction.

The controller 110 is, for example, CPU of the shaping apparatus 12 and controls each section of the shaping apparatus 12 to control the shaping operation for the three-dimensional object 50. More specifically, in this example, the controller 110 controls operation of each section of the shaping apparatus 12 based on the slice data received from the control PC 14. According to this example, the three-dimensional object 50 can be suitably shaped.

Next, a more detailed configuration of the head part 102 will be described. FIG. 1(*c*) shows an example of a more detailed configuration of a head part 102; In this example, the head part 102 has a plurality of inkjet heads, a plurality of ultraviolet light sources 204, and a flattening roller 206. As shown in the drawing, as the inkjet heads, the head part 102 has an inkjet head 202*s*, an inkjet head 202*w*, an inkjet head 202*y*, an inkjet head 202*m*, an inkjet head 202*c*, an inkjet head 202*k*, and an inkjet head 202*t*. These inkjet heads are arranged side by side in the main scanning direction with their positions aligned in the sub scanning direction, for example. Each of the inkjet heads has a nozzle array, in which a plurality of nozzles are aligned in a predetermined nozzle array direction, on the surface facing the shaping table 104. In this example, the nozzle array direction is parallel to the sub scanning direction.

Among these inkjet heads, the inkjet head 202*s* is an inkjet head that ejects the material of the support layer 52. As the material of the support layer 52, a known material for a support layer can be suitably used, for example.

The inkjet head 202*w* is an inkjet head that ejects ink of white (W) color, and forms an internal region, which is a region constituting the interior of the three-dimensional object 50, with the white ink. In addition, in this example, the white ink is an example of light reflective ink, and is used, for example, when forming a region (light reflection region) having a property of reflecting light in the three-dimensional object 50. In this case, the light reflection region reflects light entering from the outside of the three-dimensional object 50, for example when a surface of the three-dimensional object 50 is colored in a full color representation. The full color representation is, for example, a representation of a color performed with a possible combination of a subtractive color mixing method using ink of process color. In this example, the internal region is formed with white ink, so that the internal region also functions as the light reflection region.

In a modified example of the operation of the shaping apparatus 12, the internal region and the light reflection region may be formed separately. In this case, the internal region may be formed using ink other than white ink. The head part 102 may further have an inkjet head or the like that ejects shaping material ink (Mo ink) as an inkjet head for forming the internal region. In this case, the shaping material ink is, for example, ink dedicated to shaping for use in shaping the internal region of the three-dimensional object 50.

The inkjet head 202*y*, the inkjet head 202*m*, the inkjet head 202*c*, and the inkjet head 202*k* (hereinafter referred to as the inkjet heads 202*y* to *k*) are coloring inkjet heads (coloring heads) for coloring the three-dimensional object 50, and eject ink of chromatic color as an example of the coloring material. More specifically, the inkjet head 202*y* ejects ink of yellow (Y) color. The inkjet head 202*m* ejects ink of magenta (M) color. The inkjet head 202*c* ejects ink of cyan (C) color. The inkjet head 202*k* ejects ink of black (k) color. In this case, each color of Y, M, C, and K is an example of process color used for the full color representation by the subtractive color mixing method. The inkjet head 202*t* is an inkjet head that ejects clear ink. The clear ink is, for example, a clear-color ink having an uncolored transparent color (T).

The ultraviolet light sources 204 are light sources (UV light sources) for curing ink and generate ultraviolet light to cure ultraviolet curable ink. In this example, the ultraviolet light sources 204 are respectively disposed on one end side and the other end side in the main scanning direction of the head part 102 so as to sandwich the array of the inkjet heads therebetween. As the ultraviolet light source 204, UVLED (ultraviolet LED) or the like can be suitably used, for example. Further, as the ultraviolet light source 204, a metal halide lamp, a mercury lamp, or the like may be used.

The flattening roller 206 is flattening means for flattening a layer of ink formed during shaping of the three-dimensional object 50. For example, during the main scanning operation, the flattening roller 206 comes into contact with a surface of the ink layer and removes a portion of the ink before curing, thereby flattening the ink layer.

By using the head part 102 having the above configuration, the ink layer constituting the three-dimensional object 50 can be suitably formed. Further, the three-dimensional object 50 can be suitably shaped by forming the ink layers in an overlapped manner.

The specific configuration of the head part 102 is not limited to the configuration described above and can be variously modified. For example, the head part 102 may further have, as inkjet heads for coloring, inkjet heads for colors other than the above-described colors. In addition, the arrangement of the inkjet heads in the head part 102 can be variously modified. For example, with respect to some inkjet heads, the positions in the sub scanning direction may be shifted from other inkjet heads.

Figure 2A:
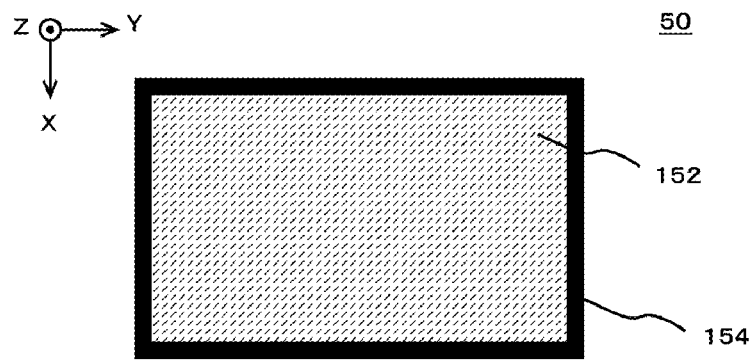

Next, an operation that generates the slice data used for shaping the three-dimensional object 50 and the like will be described in more detail. FIGS. 2(*a*) and 2(*b*) are diagrams showing an example of the operation that generates the slice data, and schematically shows an example of the configuration of the three-dimensional object 50 to be shaped by the shaping apparatus 12 and a portion of the operation that generates the slice data. FIG. 2(*a*) is a cross-sectional view showing an example of a configuration of a three-dimensional object 50 to be shaped by the shaping apparatus 12, and as shown in the drawing, the illustrated cross section is an X-Y cross section perpendicular to the Z direction (stacking direction). In this example, the configurations of a Z-X section and the X-Y section of the three-dimensional object 50 perpendicular to the Y direction and the Z direction are the same.

As also described above, in this example, the shaping apparatus 12 shapes the three-dimensional object 50 using the inkjet heads 202y to k (see FIGS. 1(a) to 1(c)) and so on. In this way, for example, the three-dimensional object 50 with the colored surface is shaped. In this case, the fact that the surface of the three-dimensional object 50 is colored is, for example, the fact that at least a portion of a region of the three-dimensional object 50 where the color can be visually recognized from outside is colored. As shown in the drawing, in this example, when the three-dimensional object 50 with the colored surface is shaped, the shaping apparatus 12 shapes the three-dimensional object 50 having an internal region 152 and a colored region 154. If necessary, a support layer is formed around the three-dimensional object 50.

The internal region 152 is a region inside the three-dimensional object 50 that configures the shape of the three-dimensional object 50. In this example, the head part 102 forms the internal region 152 using white ink ejected from the inkjet head 202w. In this way, as also described above, the internal region 152 also functions as the light reflection region.

The colored region 154 is a region colored by inks for coloring ejected from the inkjet heads 202y to k. As shown in the drawing, in this example, the colored region 154 is a layered region following a surface shape of the three-dimensional object 50. The head part 102 forms the colored region 154 around the internal region 152 by using the inks for coloring of the respective colors ejected from the inkjet heads 202y to k and the clear ink ejected from the inkjet head 202t. In this case, various colors are represented by adjusting an ejection amount of ink for coloring of each color to each position. Clear ink is used to perform compensation so that a change in the amount of ink for coloring that is caused by a difference in color matches with a constant amount. With such a configuration, for example, each position of the colored region 154 can be suitably colored with a desired color. In this way, for example, the three-dimensional object 50 with the colored surface can be suitably formed.

In a modified example of the configuration of the three-dimensional object 50, the specific configuration of the three-dimensional object 50 may be different from the above. More specifically, for example, it is conceivable to form a light reflection region between the internal region 152 and the colored region 154, distinguished from the internal region 152. In this case, the internal region 152 may be formed using ink other than white ink. For example, it is conceivable to form the internal region 152 by using any ink other than the material of the support layer 52. Further, for example, it is conceivable to form a separation region between the light reflection region and the colored region 154. In this case, the separation region is a region for preventing mixing of white ink constituting the light reflection region with ink for coloring in the colored region 154, and is formed of clear ink, for example. Furthermore, for example, it is conceivable to form a protective region outside the colored region 154 by using the clear ink ejected from the inkjet head 202t. In this case, the protective region is, for example, a transparent region for protecting an outer surface of the three-dimensional object 50.

As also described above, in this example, the shaping apparatus 12 shapes the three-dimensional object 50 based on the slice data received from the control PC 14. The control PC 14 generates the slice data based on the shaping data showing the three-dimensional object 50 to be shaped.

Figure 2B:
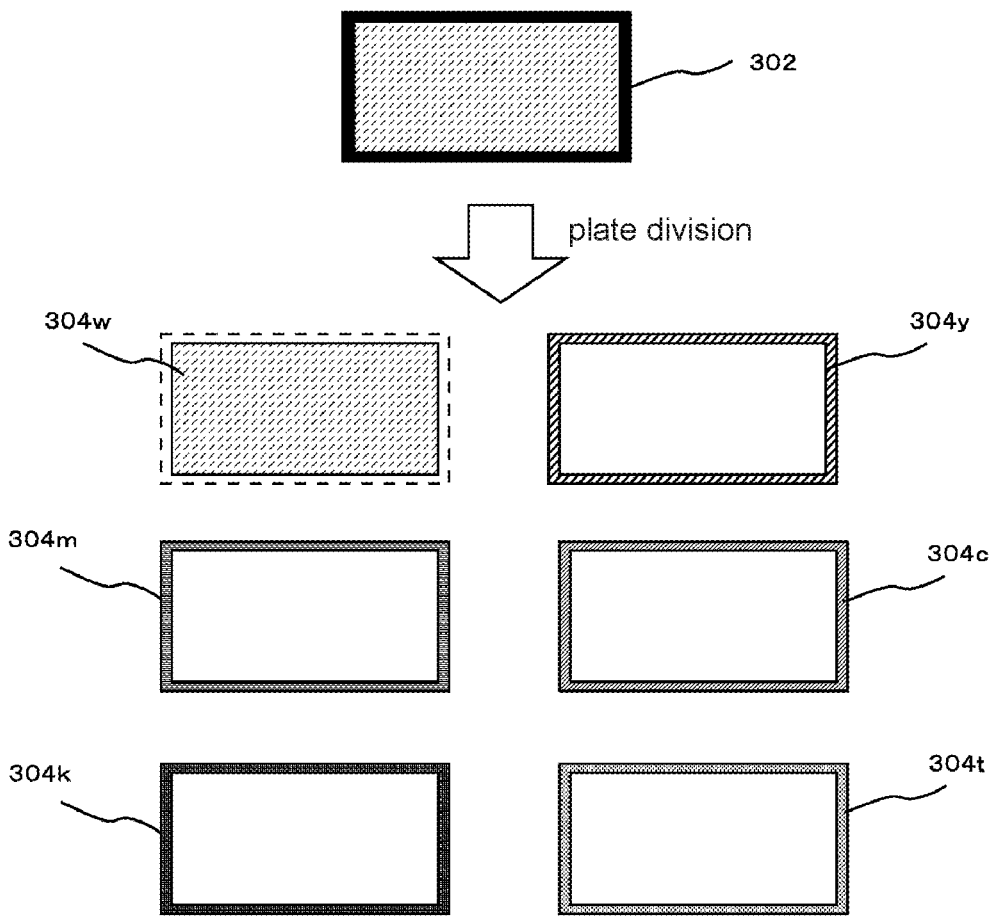

FIG. 2(b) is a diagram schematically showing a portion of the operation that generates the slice data in the control PC 14 (see FIGS. 1(a) to 1(c)), and schematically shows an example of the operation that generates the slice data corresponding to one cross section in the three-dimensional object 50.

In this example, the control PC 14 sets cross-sectional positions aligned at a constant interval in the Z direction (stacking direction), and generates the slice data corresponding to each cross-sectional position. In this case, the interval between the cross-sectional positions is set, for example, according to the thickness of the ink layer to be stacked in the layered shaping method. Further, the control PC 14 generates plate division cross-section data, which is data corresponding to each ink used for shaping, based on the shaping data. Then, the slice data is generated based on the generated plate division cross-section data. In this case, for example, each plate division cross-section data is converted according to the specifications of the shaping apparatus 12 and the like, whereby the slice data including the converted data corresponding to each plate division cross-section data is generated. In this case, in this conversion, for example, it is conceivable to perform a process of binarizing the plate division cross-section data.

More specifically, in the operation that generates the plate division cross-section data, the control PC 14 firstly generates color cross-section data 302, which is data showing a configuration of a cross section of the three-dimensional object 50 at each cross-sectional position, based on the shaping data showing the three-dimensional object 50 to be shaped. In this case, the color cross-section data 302 is data showing at least the cross-sectional shape of the three-dimensional object 50 at the cross-sectional position and the color of the three-dimensional object 50 at each position of the cross section. The cross-sectional shape is a planar shape of the cross section in a plane orthogonal to the stacking direction. The color of the three-dimensional object 50 at each position of the cross section is, for example, the color at each position represented by full color. It is conceivable that the color cross-section data 302 is, for example, a color image (sliced color image) showing the planar shape and color of the cross section.

More specifically, in this example, before generating the color cross-section data 302 at each cross-sectional position, the control PC 14 generates three-dimensional data (3D data) including each region in the three-dimensional object 50, such as the internal region 152 and the colored region 154, based on the shaping data. Then, the three-dimensional data is cut into round slices at regular intervals, so that the color cross-section data 302 at each cross-sectional position is generated. Thus, as shown in the drawing, similarly to the configuration of the three-dimensional object 50 shown in FIG. 2(a), the color cross-section data 302 has a region corresponding to the internal region 152 and a region corresponding to the colored region 154. Although not illustrated, in the case of forming the support layer around the three-dimensional object 50, if necessary the control PC 14 further adds a region corresponding to the support layer to the three-dimensional data described above, for example. In this case, the color cross-section data 302 further has a region corresponding to the support layer, for example.

After generating the color cross-section data 302, the control PC 14 color-separates the color cross-section data 302 for each color of ink used for shaping the three-dimensional object 50 and thereby generates a plurality of plate division cross-section data corresponding to inks of the respective colors. More specifically, in this example, the control PC 14 generates at least plate division cross-section data 304w corresponding to white ink, plate division cross-section data 304y, 304m, 304c, and 304k (hereinafter referred to as plate division cross-section data 304y to k) corresponding to inks of the respective colors Y, M, C and K, and plate division cross-section data 304t corresponding to clear ink. Although not illustrated, if necessary, the control PC 14 further generates plate division cross-section data corresponding to ink, which is a material of the support layer, for example. In the case of further using inks of colors other than the above-described colors, the control PC 14 further generates plate division cross-section data corresponding to the colors.

In this case, to color-separate the color cross-section data 302 is, for example, to decompose the color represented by full color in the color cross-section data 302 into colors of inks used for shaping. In this case, for example, it is conceivable to generate plate division cross-section data corresponding to ink of each color in the same or similar manner as plate division processing performed when a full color image is printed in a known ink jet printer. The plate division cross-section data corresponding to each color is, for example, data of a gray scale image and shows the amount of ink to be ejected to each position of the cross section according to a gray scale density at each position. In a modified example of the operation of the control PC 14, for example, it is also conceivable to use a binary image, formed by performing a halftone process to a gray scale image, as plate division cross-section data.

When the plate division cross-section data is generated in this way, the plate division cross-section data 304w is, for example, data in which a portion corresponding to the internal region 152 in the three-dimensional object 50 is painted. The plate division cross-section data 304y to k and the plate division cross-section data 304t are data in which a concentration corresponding to the ejection amount of ink with respect to each position of the colored region 154 in the three-dimensional object 50 is set.

As also described above, in this example, predetermined processing such as binarization is performed on such plate division cross-section data to generate the slice data. With such a configuration, for example, ink of each color can be suitably ejected to the inkjet head for each color in the shaping apparatus 12. In this way, for example, the three-dimensional object 50 with the colored surface can be suitably shaped by the shaping apparatus 12.

In this example, in order to reduce the influence of deviation of a landing position of ink occurring at the time of shaping and the like, change (adjustment) of data is further performed on at least a portion of the plate division cross-section data generated by color separation. The change of data to be performed on the plate division cross-section data will be described in more detail later.

Figure 3A:
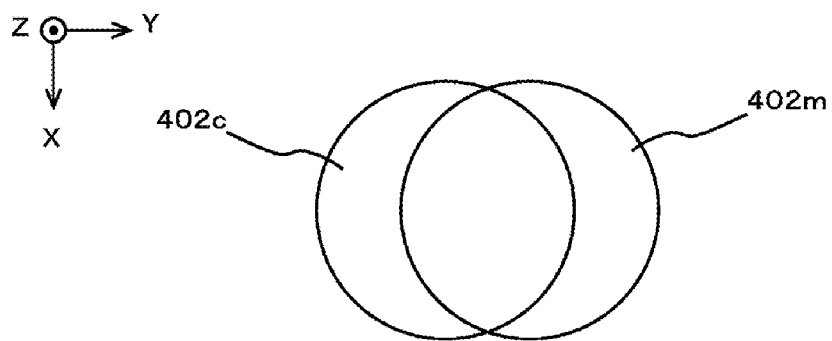
Figure 3B:
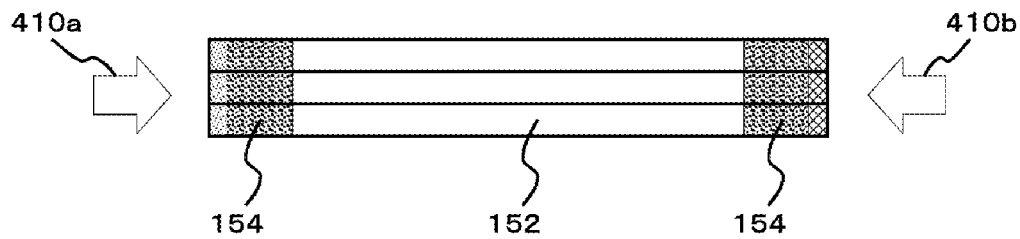
Figure 3C:
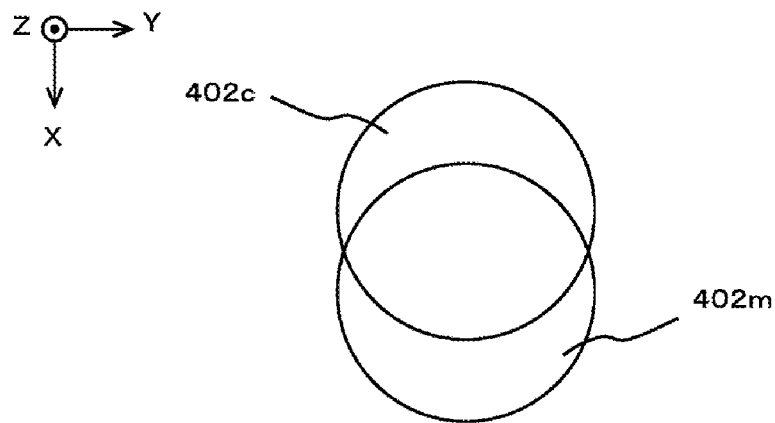

Here, the influence of the deviation of the landing position of ink occurring at the time of shaping and the like will be described in more detail. FIGS. 3(a) to 3(c) are diagrams for explaining the influence of the deviation of the landing position of ink and the like. FIG. 3(a) is a diagram showing an example of a state in which the landing position deviation (Y deviation) occurs in the main scanning direction (Y direction) and shows an example of a state in which the landing deviation position occurs in at least one of a cyan ink dot 402c and a magenta ink dot 402m. In this case, the dot 402c and the dot 402m land in a state of being deviated in the main scanning direction while partially overlapping each other, for example. As a result, the color formed by overlapping the two dots is not completely uniform, and a difference occurs depending on the position in the main scanning direction. More specifically, when the landing position deviation occurs as illustrated, a cyan portion, a portion in which cyan color and magenta color are mixed, and a magenta portion are aligned in the main scanning direction.

On the other hand, even if such a landing position deviation occurs, when an actual image is observed, an averaged state including surrounding dots is usually observed. Thus, for example, in the case of an upper surface of the three-dimensional object 50 or the like, even if such a landing position deviation occurs, it is considered that the influence on the color of the surface is small.

However, in the three-dimensional object 50, the side surface is formed by overlapping ends of ink layers to be stacked. Thus, in the case of the side surface and the like, there is a case that the tint of the surface is changed by such a landing position deviation.

FIG. 3(b) is a diagram for explaining a change in tint on the side surface of the three-dimensional object 50 and schematically shows the influence of the deviation of the landing position of ink with respect to ink layers stacked at the time of shaping. In this case, for example, when the landing position deviation as shown in FIG. 3(a) occurs, either cyan color or magenta color strongly appears on the side surface on one and the other sides in the main scanning direction. More specifically, for example, it is conceivable that the side surface on the side indicated by the arrow 410a is colored with a tint in which cyan color appears strongly. On the other hand, it is conceivable that the side surface on the side indicated by the arrow 410b is colored with a tint in which magenta color appears strongly. As a result, a difference in tint occurs on one and the other sides of the three-dimensional object 50 in the main scanning direction (left and right sides of the three-dimensional object 50).

The influence of the landing position deviation may be generated in a direction other than the main scanning direction. FIG. 3(c) is a diagram showing an example of a state in which the landing position deviation (X deviation) occurs in the sub scanning direction (X direction) and shows an example of the state in which the landing deviation position occurs in at least one of the cyan ink dot 402c and the magenta ink dot 402m. Also in this case, the color formed by overlapping the two dots is not completely uniform, and a difference occurs depending on the position in the sub scanning direction. As a result, either cyan color or magenta color strongly appears on the side surface of the three-dimensional object 50 on one and the other sides in the sub scanning direction. As a result, a difference in tint occurs on one and the other sides of the three-dimensional object 50 in the sub scanning direction (front and rear sides of the three-dimensional object 50).

On the other hand, in this example, as also described above, in order to reduce the influence of the deviation of the landing position of ink occurring at the time of shaping and the like, change (adjustment) of data is performed on at least a portion of the plate division cross-section data generated by color separation. Hereinafter, an example of a change to be performed on the plate division cross-section data will be described in more detail.

Figure 4A:
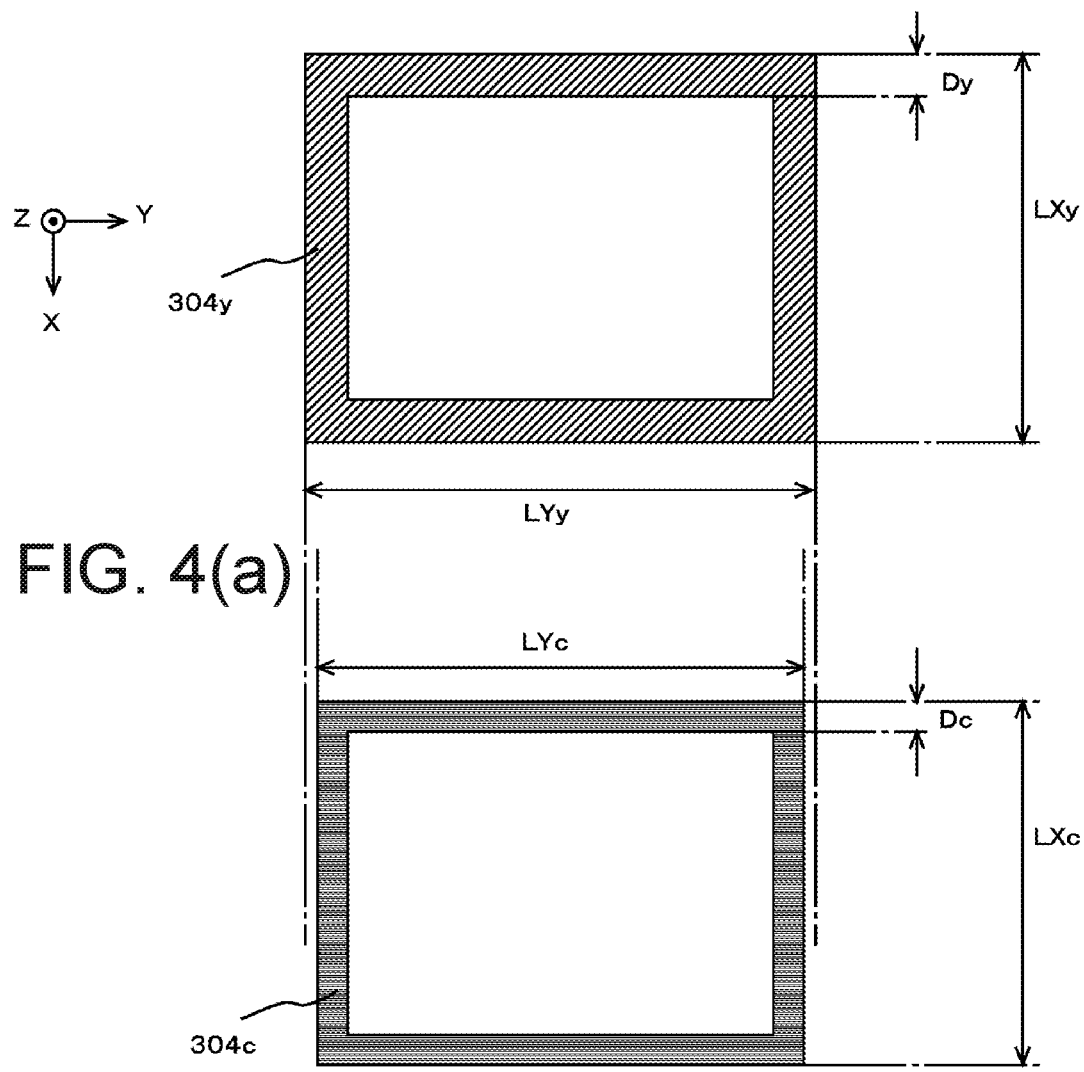
Figure 4B:
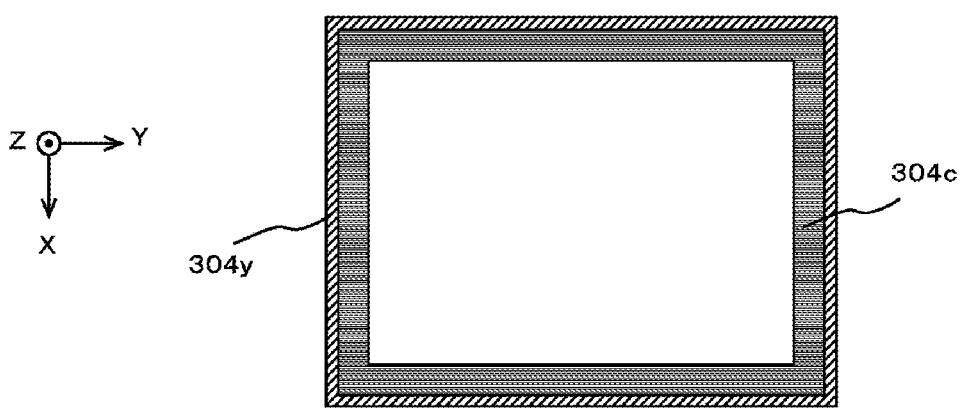

FIGS. 4(a) and 4(b) are diagrams schematically showing an example of how to change the plate division cross-section data and shows an example of operation of a plate division cross-section data change stage which is a stage that changes the plate division cross-section data in the operation of the control PC 14. The operation shown in FIGS. 4(*a*) and 4(*b*) are, for example, an example of an operation in the case of changing a portion of the plurality of plate division cross-section data used for forming at least some layers to be stacked. In this case, a portion of the plurality of plate division cross-section data used for forming at least some layers is, for example, a portion of a plurality of the plate division cross-section data corresponding to at least a portion of the color cross-section data 302 (see FIG. 2(*b*)) formed in the control PC 14 corresponding to each layer to be stacked. The plate division cross-section data 304 corresponding to the color cross-section data 302 is, for example, the plate division cross-section data 304 generated by color separation of the color cross-section data 302.

The operation shown in FIGS. 4(*a*) and 4(*b*) are also an example of an operation that changes (adjusts) the plate division cross-section data so that the range (color plate size) in which ink is ejected changes according to the plate division cross-section data. More specifically, in the operation shown in FIGS. 4(*a*) and 4(*b*), for the plurality of plate division cross-section data corresponding to the respective layers, the range in which ink is ejected according to the plate division cross-section data corresponding to any color is made larger than the range corresponding to other colors.

FIG. 4(*a*) is a diagram showing an example of how to change the range in which ink is ejected in accordance with the plate division cross-section data, and shows an example of a case where the range in which ink is ejected is made larger than the respective ranges corresponding to C (cyan) color, M (magenta) color, and K (black) color in accordance with the plate division cross-section data 304*y* corresponding to Y (yellow) color. In the drawing, for convenience of illustration, only the plate division cross-section data 304*y* corresponding to the Y color and the plate division cross-section data 304*c* corresponding to the C color are illustrated. The range in which ink is ejected according to the plate division cross-section data corresponding to the M color and the K color is the same as or similar to the range corresponding to the C color, for example.

More specifically, in the illustrated case, the width in the main scanning direction and the sub scanning direction in a range corresponding to the plate division cross-section data 304*y* are LYy and LXy. The width corresponding to the colored region 154 (see FIGS. 2(*a*) and 2(*b*)) in the plate division cross-section data 304*y* is Dy. The width in the main scanning direction and the sub scanning direction in a range corresponding to the plate division cross-section data 304*c* are LYc and LXc. The width corresponding to the colored region 154 in the plate division cross-section data 304*c* is Dc. In this case, the respective width have a relationship satisfying LXy>LXc, LYy>LYc, and Dy>Dc.

For convenience of illustration, in FIGS. 4(*a*) and 4(*b*), the plate division cross-section data 304*y* and the plate division cross-section data 304*c* are shown shifted in position. However, on the coordinates that manage the position of the plate division cross-section data, the plate division cross-section data 304*y* and the plate division cross-section data 304*c* overlap each other with their centers aligned as shown in FIG. 4(*b*), for example. FIG. 4(*b*) shows an example of a state in which the plate division cross-section data 304*y* and color cross-section data 302*c* are superposed.

In this example, the control PC 14 changes at least one of the plate division cross-section data 304 corresponding to the Y color and the plate division cross-section data corresponding to the colors (M, C, and K colors) of inks for coloring other than the Y color to change the range corresponding to at least some plate division cross-section data.

More specifically, in this case, as shown in the drawing for example, in a state after changing the plate division cross-section data, the range of the plate division cross-section data 304*y* is made larger than the range of the plate division cross-section data 304*c* and the like. In this case, as shown in FIG. 4(*b*) for example, for an outer edge portion corresponding to the outside of the three-dimensional object, the outer edge of the range of the plate division cross-section data 304*c* is outside the outer edge of the range of the plate division cross-section data 304*c*.

In such a configuration, an outermost side (outermost portion) of the three-dimensional object is formed with a certain color (Y color) at the time of shaping the three-dimensional object in the shaping apparatus 12 (see FIGS. 1(*a*) to 1(*c*)). In this case, for example, even when the landing position of ink for coloring deviates, it is possible to make it difficult for the tint to change. Thus, with such a configuration, for example, it is possible to suitably prevent a change in the appearance of color of the three-dimensional object due to the deviation of the landing position of ink. In this way, for example, the colored three-dimensional object can be more suitably shaped with high accuracy.

Here, for example, when the deviation amount of the landing position of ink is larger than the resolution of shaping, it is preferable not to change the plate division cross-section data as described above but to reduce the deviation by, for example, adjusting the timing of ejecting the ink. For this reason, when the plate division cross-section data is changed, for example, it is preferable to change the range by a minimum interval (minimum inter-dot pitch) of the ejection position according to the resolution of shaping. In this case, the minimum interval of the ejection position corresponds to, for example, one dot of the resolution of shaping. With such a configuration, for example, it is possible to suitably suppress the influence of the deviation of the landing position of ink without excessively changing the plate division cross-section data.

More specifically, in this case, for example, for the plate division cross-section data whose range is made larger than the plate division cross-section data corresponding to other colors like the plate division cross-section data 304*y*, it is conceivable to extend the outer edge portion by one dot. To extend the outer edge portion by one dot is, for example, to add data corresponding to one dot to the outside of each position of the outer edge of the plate division cross-section data. In this case, for example, it is conceivable to add a dot having a preset constant gray scale density (for example, maximum density).

When the plate division cross-section data is changed, it is conceivable to reduce the range of the plate division cross-section data 304*c* and the like, instead of changing the plate division cross-section data 304*y*. In this case, it is conceivable to reduce the outer edge portion by one dot with respect to the plate division cross-section data 304*c* and the like. To reduce the outer edge portion by one dot is, for example, to delete data corresponding to one dot at each position of the outer edge of the plate division cross-section data.

In the operation described with reference to FIGS. 4(*a*) to 4(*c*), the Y color is an example of the first color. The range in which ink is ejected according to the plate division cross-section data 304*y* is an example of the first range. Each color of M, C, and K is an example of the second color. The range in which ink is ejected according to the plate division cross-section data corresponding to each color of M, C, and K is an example of the second range. In this case, regarding the way of changing the plate division cross-section data described above, when considering a more general way, the way can be considered as the operation that changes the plate division cross-section data corresponding to at least one of the first color and the second color so as to prevent the second range from protruding to the outside of the three-dimensional object relative to the first range.

For example, it is also conceivable to set the first color and the second color to colors other than the above-described colors. In this case, the first color is preferably brighter than the second color. The bright color is, for example, a color with a lower light absorption rate. With such a configuration, for example, even when the landing position of ink for coloring deviates, it is possible to suitably prevent a dark-colored ink from deviating outside the three-dimensional object. This also makes it possible, for example, to more suitably suppress the change in the appearance of color.

In the setting of the first color and the second color, for example, it is also conceivable to change the setting for each layer to be stacked. In this case, for example, the first color is set for each layer, and a color other than the first color in the color of ink for coloring is set to the second color. In this case, for example, it is conceivable to set the first color such that the setting of the first color differs between successively overlapping layers in the stacking direction. With such a configuration, for example, the way in which the color changes in each layer is made different for each layer, and can be averaged over the entire surface. This also makes it possible, for example, to suitably suppress the change in tint due to the landing position deviation. Regarding the selection of the first color, for example, it is conceivable to randomly select the color for each layer.

Figure 5A:
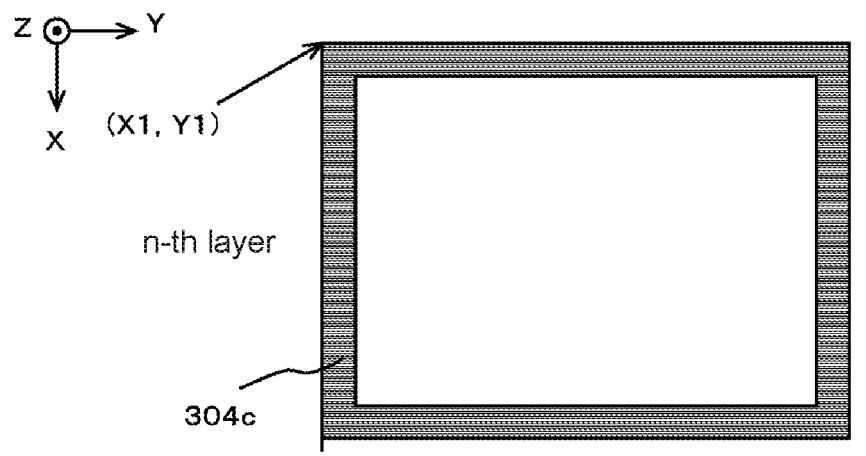
Figure 5B:
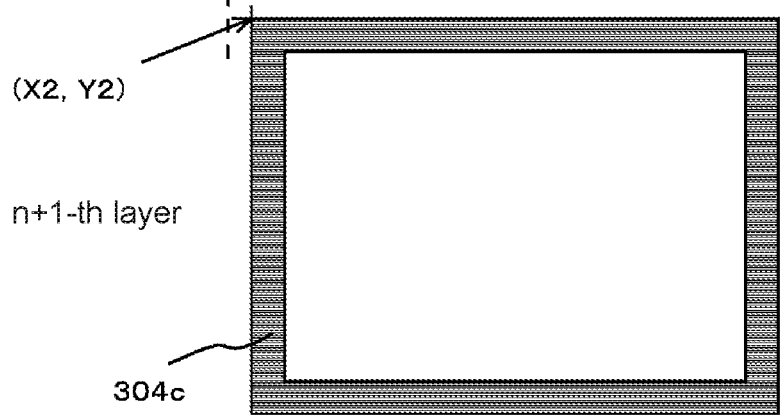

Regarding the change of the plate division cross-section data, it is conceivable to perform a change other than the extension or reduction of the range as described above. FIGS. 5(a) and 5(b) are diagrams schematically showing another example of how to change the plate division cross-section data, and shows an example of an operation in the case of not changing the size of the range corresponding to each plate division cross-section data but shifting the position to change the range corresponding to the plate division cross-section data.

In this case, to shift the position with respect to the plate division cross-section data is, for example, to shift the position of the plate division cross-section data in a plane (XY plane) orthogonal to the stacking direction with respect to at least some plate division cross-section data corresponding to at least some of the color cross-section data 302. The position of the plate division cross-section data is, for example, a position at which ink is ejected according to the plate division cross-section data at the time of shaping. When the position of the plate division cross-section data is shifted, for example, it is conceivable to shift a reference position of the plate division cross-section data on the coordinates that manage the position of the plate division cross-section data.

FIG. 5(a) is a diagram showing an example of how to shift the position of the plate division cross-section data, and shows an example of a state in which the position of the plate division cross-section data 304c corresponding to C color is shifted. In FIG. 5(a), the upper diagram is the separation plate section data 304c before the position is shifted. On the other hand, the lower diagram shows a state in which the plate division cross-section data 304c is shifted by a predetermined distance dy in the main scanning direction. When the position of the plate division cross-section data 304c is shifted in this manner, for example, the range in which ink is ejected according to the plate division cross-section data 304c can be changed.

In this case, it is preferable that out of the plate division cross-section data of the colors corresponding to the single plate division cross-section data 304, the positions of the plate division cross-section data 304 of some colors are shifted. In addition, it is preferable that the way of shifting the plate division cross-section data changes for each layer to be stacked. The color of the plate division cross-section data that shifts the position may be different for each layer. In this case, for example, it is conceivable to shift the plate division cross-section data of different colors between successively overlapping layers in the stacking direction. For example, it is also conceivable to shift the plate division cross-section data corresponding to a randomly selected color in each layer.

FIG. 5(b) is a diagram schematically showing a state in which ink layers are formed while shifting positions of some plate division cross-section data, and shows an example of the position of the plate division cross-section data 304c in the XY plane with respect to an n-th layer and an n+1-th layer which are two successively overlapping layers. In the illustrated example, the position of the plate division cross-section data 304c in the n+1-th layer is shifted by the predetermined distance dy in the main scanning direction (Y direction) as compared with the position in the n-th layer.

When the positions of some plate division cross-section data are shifted in this way, for example, the way of overlapping ink dots changes at the end of the ink layer constituting the side surface of the three-dimensional object. In this case, by making the way of shifting the position different for each layer, for example, the tint of an end of the colored region 154 changes for each layer.

Thus, in such a configuration, for example, even when the landing position of ink for coloring constituting the colored region 154 deviates, the influence of the deviation can be dispersed and averaged. This also makes it possible, for example, to suppress the influence of the appearance of color in individual layers on the side surface of the three-dimensional object or the like, and to uniformize the tint of each surface. Thus, with such a configuration, it is possible to suitably represent a desired color (tint) of each surface of the three-dimensional object.

The operation shown in FIGS. 5(a) and 5(b) may be considered as a configuration that gives error such that the same tint is obtained as a surface by intentionally shifting the position of the plate division cross-section data for each layer. Regarding the way of shifting the plate division cross-section data, for example, it is conceivable to shift the plate division cross-section data corresponding to a preset color alternately to the left, right, back and forth in the drawing, in order for each layer to be stacked. In this case, to shift alternately to the left and right in the drawing is to shift alternately in one and the other direction in the main scanning direction. On the other hand, to shift alternately to the back and forth is to shift alternately in one and the other direction in the sub scanning direction.

Further, regarding the way of shifting the plate division cross-section data, for example, it is conceivable to randomly shift the plate division cross-section data for each layer to be stacked. The plate division cross-section data whose position is to be shifted is not limited to the plate division cross-section data of a certain color. For example, selection of color is changed for each color, and the position of the plate division cross-section data corresponding to the selected color may be shifted.

In the case of shifting the position of the plate division cross-section data, it is preferable to make the shift amount correspond to one dot corresponding to a minimum interval of the ejection position according to the resolution of shaping. In this case, to shift the position of the plate division cross-section data by one dot is to shift the position by one dot in one or both of the main scanning direction and the sub scanning direction. With such a configuration, for example, it is possible to suitably suppress the influence of the deviation of the landing position of the coloring material without excessively changing the plate division cross-section data.

Figure 6:
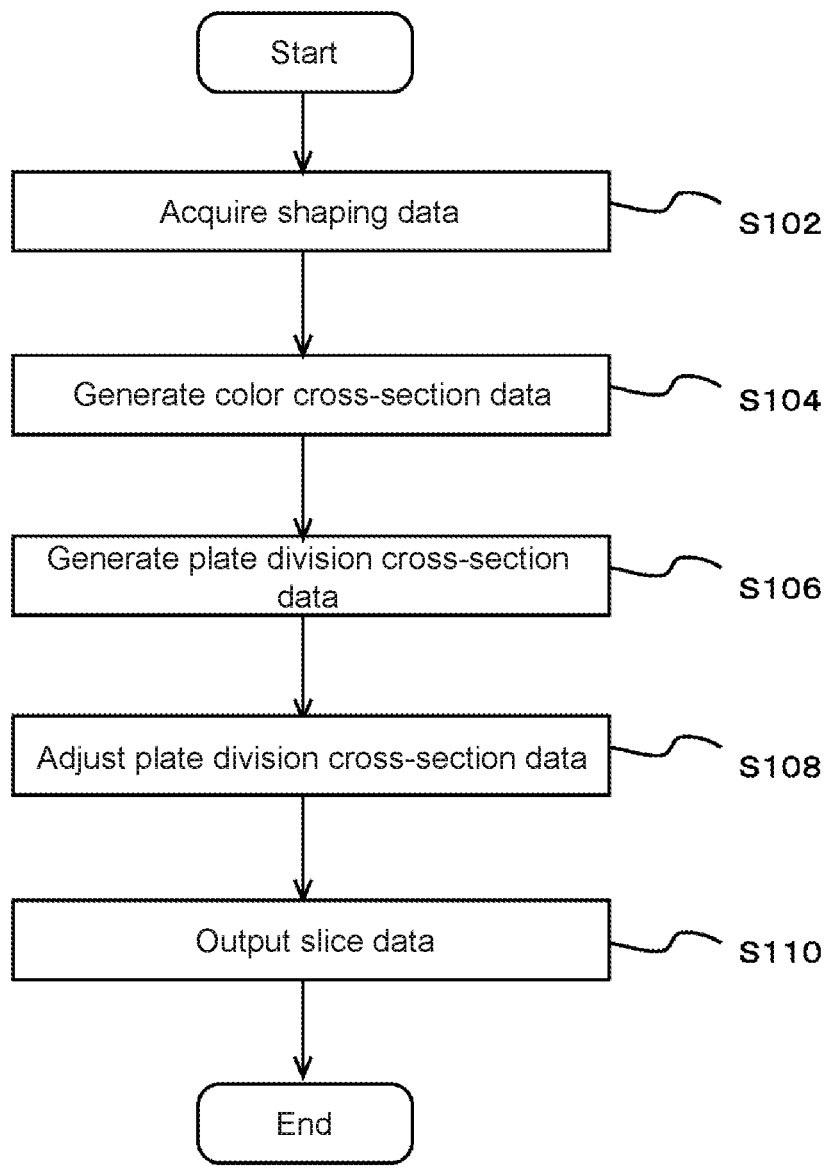
FIG. 6 is a flow chart showing an example of the operation that generates the slice data in the control PC 14.

Next, the whole operation that generates the slice data in the control PC 14 will be described in more detail. FIG. 6 is a flow chart showing an example of the operation that generates the slice data in the control PC 14. In this example, the operation shown in this flow chart is an example of operation of a slice data generation stage.

In this example, when the slice data is generated, the control PC 14 first acquires the shaping data from the outside of the control PC 14 through a network, a storage medium, or the like (S102). As described above with reference to FIGS. 2(*a*) and 2(*b*), for example, the control PC 14 generates the color cross-section data at each cross-sectional position based on the shaping data (S104). In this example, the operation of step S104 is an example of operation of a color cross-section data generation stage. Subsequently to the operation of step S104, the control PC 14 generates the plate division cross-section data for each color based on each color cross-section data (S106). In this example, the operation of step S106 is an example of operation of a plate division data generation stage.

Figure 5B:
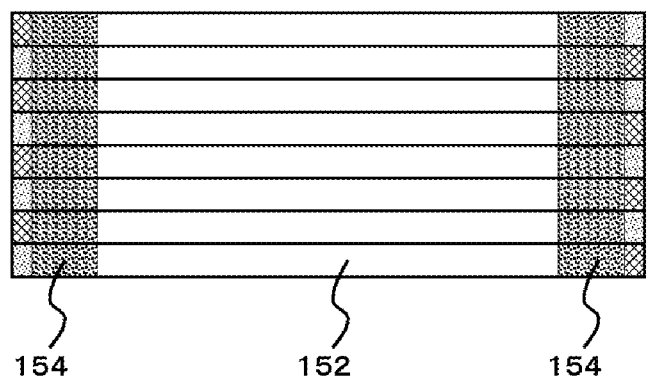

Subsequently to the operation of step S106, as described above with reference to FIGS. 4(*a*) and (b), FIGS. 5(*a*) and 5(*b*), or the like, the control PC 14 changes (adjusts) at least some of the plate division cross-section data (S108). According to this constitution, the range corresponding to some plate division cross-section data is changed, and at least a portion of the position at which ink is ejected according to the plate division cross-section data is changed. In this example, the operation of step S108 is an example of operation of a plate division cross-section data change stage.

Subsequently to the operation of step S108, the control PC 14 generates the slice data for each color based on the plate division cross-section data after change in step S108. In this case, for example, the control PC 14 binarizes the plate division cross-section data or changes the format of data according to the model of the shaping apparatus 12 to generate the slice data based on the plate division cross-section data. Then, the generated slice data is output to the shaping apparatus 12 (see FIGS. 1(*a*) to 1(*c*)) (S110). According to this example, the slice data can be suitably generated based on the shaping data while changing the plate division cross-section data, for example.

In this case, the shaping apparatus 12 shapes a three-dimensional object by the layered shaping method according to the slice data received from the control PC 14. The shaping operation performed in the shaping apparatus 12 is an example of operation of a shaping execution stage. In this case, by performing shaping in accordance with the slice data generated based on the changed plate division cross-section data, as described above, the influence of the deviation of the landing position of ink for coloring can be suitably suppressed. Also, by this, it is possible to suitably shape the colored shaped object with high accuracy.

Next, further modifications of the operation that changes the plate division cross-section data will be described. In the above description, regarding the change of the plate division cross-section data, the operation in the case where the range in which ink is ejected according to the plate division cross-section data is changed has been mainly described. However, as for a further modification of the operation that changes the plate division cross-section data, for example, it is conceivable to change the configuration in the plate division cross-section data without changing the range of the plate division cross-section data.

More specifically, in this case, for example, it is conceivable to change color density within a width (thickness) of a portion corresponding to the colored region 154 (see FIGS. 2(*a*) and 2(*b*)) in the plate division cross-section data to realize gradations. In this case, for example, it is preferable to change the color density such that the inside color of the three-dimensional object becomes darker and the outside color becomes lighter. With such a configuration, for example, even when the landing position of ink for coloring deviates, it is possible to reduce the influence on color of an outermost surface of the three-dimensional object. This also makes it possible to suitably suppress the change in tint of a surface such as the side surface.

The operation that changes the plate division cross-section data in this way may be considered as a configuration in which, with respect to at least some plate division cross-section data corresponding to at least some color cross-section data, a density in a region outside the three-dimensional object is reduced with respect to a density at the position at which ink is ejected. In this case, it is preferable to increase a density in a region inside the three-dimensional object by an amount that is reduced relative to the outside. Such a configuration that the density is changed may be considered as a configuration in which a gradient is given to color density such that the outside color becomes lighter and the inside color becomes darker.

In the above description, for example, the operation in the case of changing the plate division cross-section data of each color of Y, M, C, and K which is the color of ink for coloring has been described. However, regarding the change of the plate division cross-section data, it is conceivable to change the plate division cross-section data corresponding to clear ink, for example. In this case, for example, it is conceivable to increase the amount of clear ink to be ejected near the outermost surface of the three-dimensional object and blur ink of each color of Y, M, C, and K with clear ink.

With such a configuration, for example, even when the landing positions of dots of ink of each color are separated, the color can be made more uniform by blurring with the clear ink. This also makes it possible to suitably suppress the change in tint of a surface such as the side surface, for example. More specifically, in this case, for example, it is conceivable to make the range of the plate division cross-section data corresponding to the clear ink larger than the plate division cross-section data corresponding to other colors in the same or similar manner as the plate division cross-section data 304*y* shown in FIGS. 4(*a*) and 4(*b*).

The configuration in which ink of each color of Y, M, C, and K is blurred by clear ink may be realized by a method other than changing the plate division cross-section data. Also in this case, by blurring the ink of each color of Y, M, C, and K with the clear ink near the outermost surface of the three-dimensional object, for example even when the landing positions of dots of ink of each color are separated, the color can be made more uniform.

In the above description, mainly focusing on the fact that the influence of the deviation of the landing position of ink is suppressed, the effect obtained by changing the plate division cross-section data has been described. However, more generalizing this, it is conceivable to suppress the influence by changing the plate division cross-section data with respect to not only the landing position deviation but also the change in tint and the like due to other causes. For example, when a difference depending on color of ink (difference in dot gain between colors) occurs in the size (dot gain) of ink dots formed by landing is different, for example, it is conceivable to suppress the influence by changing the plate division cross-section data. Such a difference in dot gain between colors occurs due to, for example, the influences of a machine difference between inkjet heads to be used, habit of each nozzle, and a characteristic difference between lots of ink to be used. Thus, in this case, it can be considered that the influence of such items can be suppressed by changing the plate division cross-section data.

INDUSTRIAL APPLICABILITY

The present disclosure can be suitably used, for example, in a shaping method.

What is claimed is:

1. A shaping system that shapes a three-dimensional object,
   at least the surface of which is colored, the shaping system comprising:
   a shaping apparatus that shapes the three-dimensional object based on a plurality of slice data, showing a configuration of a cross section of the three-dimensional object at different positions in a preset stacking direction; and
   a shaping controller that is an apparatus for controlling operation of the shaping apparatus and generates the plurality of slice data based on shaping data which is data showing the three-dimensional object to be shaped by the shaping apparatus,
   wherein the shaping apparatus shapes the three-dimensional object by using a plurality of ejection heads for ejecting materials of plural colors different from one another, and
   when the shaping controller performs
   an operation in a color cross-section data generation step that generates color cross-section data which is data showing the configuration of the cross section of the three-dimensional object at a preset cross-sectional position in the stacking direction and shows at least a shape of the cross section and a color of the three-dimensional object at each position of the cross section,
   an operation in a plate division data generation step that generates plate division cross-section data which is data in which the color cross-section data is color-separated for each color of the material used for shaping the three-dimensional object, and
   an operation in a plate division cross-section data change step that changes the plate division cross-section data such that at least a portion of a position where the material is ejected according to the plate division cross-section data is changed with respect to at least some of the plate division cross-section data, the slice data is generated based on the plate division cross-section data changed in the plate division cross-section data change step,
   wherein in the plate division cross-section data change step, when a position of the plate division cross-section data in a plane orthogonal to the stacking direction is shifted with respect to at least some of the plate division cross-section data corresponding to at least some of the color cross-section data, the plate division cross-section data is changed such that the range in which the material is ejected according to the plate division cross-section data is changed.

2. A shaping apparatus that shapes a three-dimensional object, at least the surface of which is colored,
   by using a plurality of ejection heads for ejecting materials of plural colors different from one another, the three-dimensional object being shaped based on a plurality of slice data showing a configuration of a cross section of the three-dimensional object at different positions in a preset stacking direction,
   the plurality of slice data being data generated based on shaping data which is data showing the three-dimensional object to be shaped by the shaping apparatus, and
   an operation in a color cross-section data generation step that generates color cross-section data which is data showing the configuration of the cross section of the three-dimensional object at a preset cross-sectional position in the stacking direction and shows at least a shape of the cross section and a color of the three-dimensional object at each position of the cross section,
   an operation in a plate division cross-section data generation step that generates plate division cross-section data which is data in which the color cross-section data is color-separated for each color of the material used for shaping the three-dimensional object, and
   an operation in a plate division cross-section data change step that changes the plate division cross-section data such that at least a portion of a position where the material is ejected according to the plate division cross-section data is changed with respect to at least some of the plate division cross-section data being performed to generate the slice data based on the plate division cross-section data changed in the plate division cross-section data change step,
   wherein in the plate division cross-section data change step, when a position of the plate division cross-section data in a plane orthogonal to the stacking direction is shifted with respect to at least some of the plate division cross-section data corresponding to at least some of the color cross-section data, the plate division cross-section data is changed such that the range in which the material is ejected according to the plate division cross-section data is changed.

* * * * *